L. J. ORENDORF.
TRAFFIC SIGNAL.
APPLICATION FILED MAY 23, 1921.
1,405,861.
Patented Feb. 7, 1922.
2 SHEETS—SHEET 1.
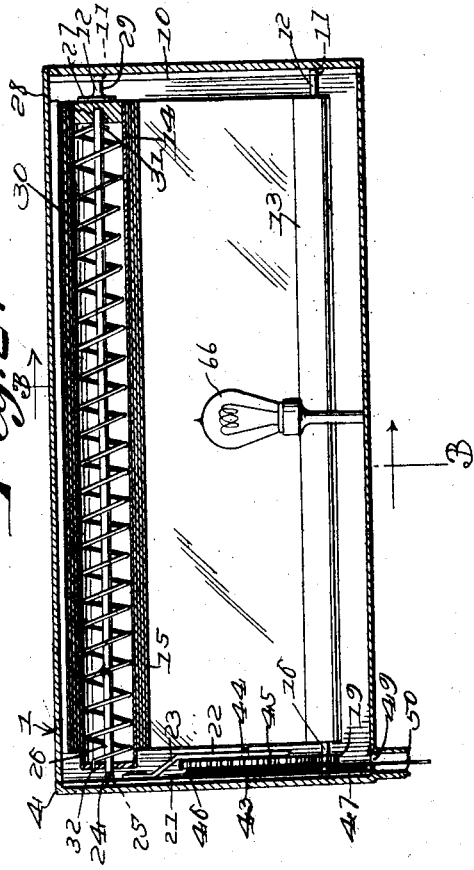
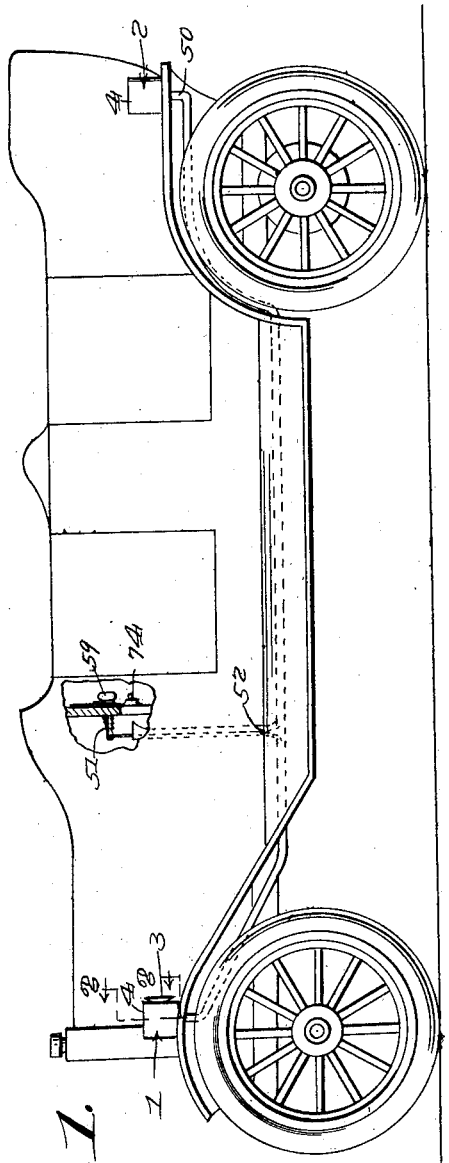
Inventor
L. J. Orendorf,
By Watson E. Coleman
Attorney

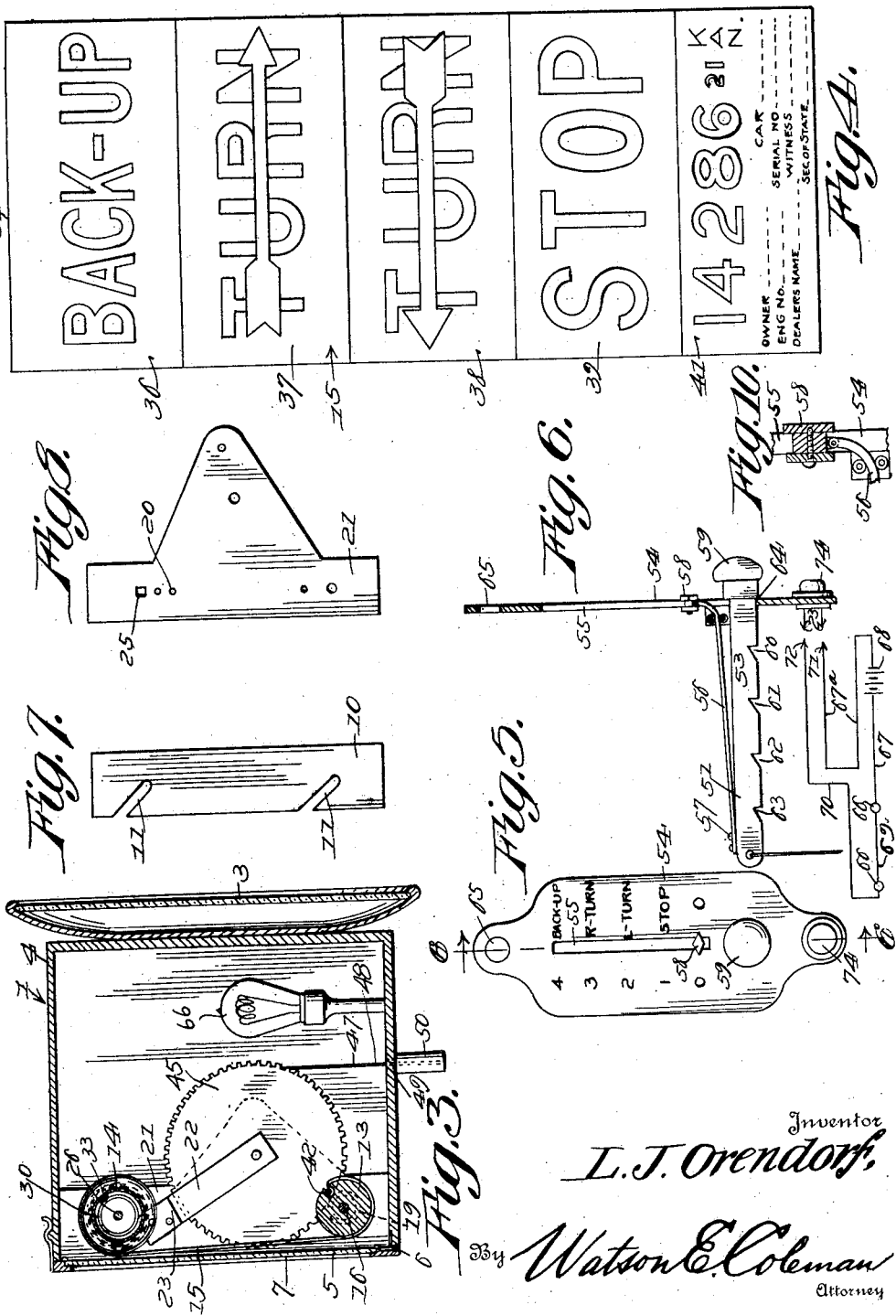

UNITED STATES PATENT OFFICE.

LEE J. ORENDORF, OF MULVANE, KANSAS.

TRAFFIC SIGNAL.

1,405,861.  Specification of Letters Patent.  Patented Feb. 7, 1922.

Application filed May 23, 1921. Serial No. 471,555.

*To all whom it may concern:*

Be it known that I, LEE J. ORENDORF, a citizen of the United States, residing at Mulvane, in the county of Sumner and State of Kansas, have invented certain new and useful Improvements in Traffic Signals, of which the following is a specification, reference being had to the accompanying drawings.

The present invention has for its purpose the provision of a signal of this general character, particularly mounted on the forward and rear ends of the left hand fender of an automobile, to be operated by a single actuator on the dash, to signal to the crossing policeman and to the chauffeur of an automobile in the rear, whether or not it is the intention to turn to the right or the left, stop, or to back-up.

Another purpose embodies a signaling box, which not only may be used for signaling the intention of the chauffeur as to the direction of the automobile, but also acts as a searchlight on the forward or rear end of the automobile, to permit the chauffeur to be able to back out of dark driveways at night; said signaling box also acts as a danger light at the front and rear when the automobile is parked and the headlights are out of order.

Still another purpose is the provision of a signal which acts as a taillight, and wherein the movable chart for signaling directions, also contains identification data, for identifying the owner of the automobile, when such identification is required.

A further purpose consists in the provision of a pair of signals for use on the forward and rear ends of the left hand fender, acting to gauge the distance between two automobiles when passing on narrow roadways. For instance the locations of the signals on the forward and rear ends of the left hand fender, and being that when two automobiles are passing, the left hand sides of the automobiles are adjacent, it enables the chauffeur of both machines, to gauge the distance between them in passing, particularly owing to location of the rays of light emanating from the signals.

A still further purpose embodies the provision of a traffic signal apparatus, wherein the actuator on the dash of the automobile includes an indicator, movable over the chart, so that the chauffeur or the driver of the automobile, may actuate the signals on the forward and rear ends of the left hand fender, correspondingly to the desired indication on the chart.

Additionally the invention aims to provide a mirror on the rear face of the forward signal, so that at a glance the chauffeur or the driver of the automobile may observe readily, as to whether or not the signals indicated by the actuator have been understood or heeded by the chauffeur or driver of the automobile at the rear.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a side view showing signals on the forward and rear ends of an automobile, and also showing an actuator for controlling the signals.

Figure 2 is a longitudinal sectional view on line 2—2 of Figure 1, at a point to the rear of the chart and through the spring roller which carries the chart, in order to show the construction.

Figure 3 is a cross sectional view on line 3—3 of Figure 2, not only showing the rollers carrying the chart, but also showing the construction whereby the rollers and the chart are operated.

Figure 4 is an enlarged detail view of the chart carried by the rollers.

Figure 5 is a face view of the indicator and the actuating means for the traffic signals.

Figure 6 is a vertical sectional view on line 6—6 of Figure 5.

Figure 7 is a detail view of the plate 10.
Figure 8 is a detail view of the plate 21.
Figure 9 is a cross sectional view of the roller 13.
Figure 10 is a detail sectional view of the connection between the pointer or indicator 58 and the part 56.

Referring to the drawings, 1 and 2 designate the forward and rear signals to be carried by the forward and rear ends of the left hand fender of an automobile, and 3 denotes a suitable mirror located and attached to the rear face of the forward signal, wherein the chauffeur or driver of the automobile may observe the reflection, as to whether or not the driver or chauffeur of the automobile at the rear has observed the signals given.

Each signal is alike, and therefore comprises a casing 4 provided with a closure 5 hingedly mounted on the casing 4 by means of the hinges 6. This closure 5 comprises a frame of the construction shown, and which is supplied with a transparent member or surface, preferably of glass 7, through which the readings on the signal chart may be read, by the traffic officer, as well as by the pedestrian.

Secured on the inner face of one end 9 of the casing or housing is a plate 10 having inclined slot bearings 11, which are designed to receive the round pintles 12 of the corresponding ends of the rollers 13 and 14, on which the signal chart 15 is operatively mounted. The roller 13 comprises a plain body through which a rod 16 engages. The roller 13 is solid throughout its length, and is considerably reinforced and strengthened by means of the heavy steel rod 16 which fits through the solid roller 13. One end of the roller 13 has a pinion or gear 19. The end of the rod or shaft 16 beyond the gear or pinion 19, is cylindrical, the same as the other pintle.

One end of the casing has riveted thereto as at 20 a pair of spaced plates 21 and 22. These plates are spaced by means of the bend 23 formed in the plate 22.

The square or rectangular pintle 24 is mounted in a correspondingly shaped bearing 25 of the upper end of the plate 21, to hold the rod 26 from turning under the action of a spring of the roller 14. The rod 26 extends through the casing of the roller 14, so that the hollow roller may rotate around it. The end 27 of the rod rotates in a bearing 28 of one end of the hollow roller 14, and the round pintle 12 of the roller 14 is carried by the exterior face of the bearing 28 of the hollow roller 14. A coiled spring 30 is mounted in the hollow roller and in surrounding relation to the rod 26 and has one end attached at 31 to the rod, while its other end is attached at 32 to the opposite end of the roller.

The wall of the roller 14 has a longitudinally extending groove 33 formed therein, and which is designed to receive the end edge 34 of a direction signal chart 15. This chart 15 has divided off spaces, which include the direction signals, to be used by the chauffeur of the automobile. For instance these signals comprise the words "Back-up" 36, "Turn" including an arrow pointing to the right as indicated at 37, a second word "Turn" including an arrow indicated at 38, the word "Stop" 39, and the usual license number 40. Below the license number is suitable identification data 41 as to the owner of the automobile. This chart has one end attached in the groove 33 and wound around the roller 14, and its other end is attached to the roller 13 by a similar groove 42. This chart 15 is normally positioned so that the license number and the identification data at all times when the chart is not operated, are disclosed through the glass of the door or closure. However when the roller 13 is rotated, the chart is unreeled from the roller 14 against the action of the spring 30, so as to disclose any one of the other directions through the glass front of the door.

Journaled in bearings of the plates 21 and 22 are the axially aligned pintles 43 and 44 of the gear 45, which is located between the plates 21 and 22 as shown. This gear 45 on one face thereof has an annular pulley groove 46, in which one end 47 of a cable 48 is attached. This cable is wound sufficiently around and in the groove, so that a pull of the cable corresponding to the distance the cable is wound on the pulley, and corresponding to the length of the chart 15, so that by imparting movement to the gear 45 (which meshes with the pinion or gear 19), the chart may be unreeled from the roller 14 against the action of its spring 30, sufficiently to disclose the traffic direction back-up.

The cable 48 passes down through an opening 49 in the bottom of the housing or casing, and passes through a flexible tube 50, and is connected to a pull bar 51 of a combined actuator and indicator carried by the dash of the automobile. The cables from both of the direction signals of the forward and rear ends of the left hand fender, are spliced together as at 52, so that a single actuator comprising a pull bar may operate both signals simultaneously, so as to disclose to the traffic officer in the front and the chauffeur on the automobile in the rear the intention as to whether or not the chauffeur or driver of the automobile will turn to the right or the left, stop, or back-up.

The actuator or pull member is mounted in a guide of the dash of the automobile, and operates through an opening 53 of an indicator plate 54, which has thereon the words "Stop", "Left turn", "Right turn" and "Back-up." The indicator plate has an elongated vertical slot 55, through which a steel strap 56 engages. This steel strap is sufficiently pliable to bend, as it travels up the slot, when the pull bar or actuator 51 is pulled out. This steel strap is connected to the pull bar as indicated at 57, and its other end is attached to a pointer or indicator 58. This pointer or indicator moves over the slot, and may be stopped according to either one of the directions disclosed on the indicator plate. The actuator or pull member 51 has a handle 59, so that when the pull member or actuator is moved outwardly, the indicator will travel upwardly along the slot. Should the chauffeur desire to turn to the left the indicator may be stopped opposite the words L-turn, indicating left turn, or if the chauffeur wants to turn to the right, it may be stopped at R-turn, meaning right turn. Should the chauffeur desire to back-up the indicator may be stopped opposite the works Back-up on the indicator. Should the chauffeur wish to stop, the pull member or actuator may be moved to actuate the indicator opposite the word Stop. The pull member or actuator on its lower edge is provided with a plurality of notches 60, 61, 62 and 63, and also a shoulder 64. The shoulder 64 holds the actuator or pull member, so that the indicator is always in neutral position indicating the license number and the identification data. It will be noted that the notches are all angularly formed, and they correspond in number to the number of directions on the indicator plate, therefore the pull member or actuator may be operated, so that the notch 60 may engage the lower edge of the opening 53 of the indicator plate, then the indicator will be held opposite the word Stop. If the pull member or actuator is pulled out, so that the indicator will be opposite the words L-turn, then the notch 61 will engage the lower edge of the opening 53 of the indicator plate. Obviously it will be noted as to how the actuator may be held, when it is desired to give the directions right turn, or back-up. The indicator plate 54 is fastened on a dash as at 65.

The interiors of the casing of each direction signal is provided with one or more electric bulbs 66, which are connected by a suitable lead 67 to a battery 68. The electric bulbs are in turn connected by a lead 69, and in circuit with the battery 68 by a lead 70, and by a lead 67ᵃ and the stationary contacts 71 and 72, which are engaged by the contact 73 of a switch member 74, which may be operated inwardly for the purpose of closing the circuit, whereby the interiors of the signal casings or housings may be illuminated. The signal chart is designed to be constructed of any suitable pliable transparent material, such as celluloid or the like, so that the rays of light may reflect through the chart, and thereby disclose the traffic directions to be followed, after night fall. During the day the dark lettering upon the transparent chart will be discernible readily and easily.

The invention having been set forth, what is claimed as being useful is:

1. In a device for the purpose indicated, a signal apparatus comprising a housing provided with a transparent front, a pair of supports arranged in perpendicular parallelism and connected to the opposite ends of the housing adjacent the transparent front, one of said supports having a projection, a spring tensioned roller detachably mounted in the corresponding upper ends of said supports, a reeling roller detachably mounted in the corresponding lower ends of said supports, a direction chart connected to and rolled about the spring tensioned roller and having one end connected to the reeling roller and adapted to travel from one to the other whereby the directions on the chart are readable through the transparent front, said chart having a plurality of direction sections on its face exposed immediately to the rear of the transparent front, a gear carried by one end of the reeling roller, an operating master gear mounted on said projection and meshing with the gear of the reeling roller and provided with a pulley approximating the diameter of the operating gear, and actuating means operatively connected with the pulley for reeling the chart from the spring tensioned roller to the reeling roller, the construction and arrangement of said gearing being such, whereby a partial movement of the master operating gear will impart movement to the reeling roller sufficient to move the chart its full length, so that all the directions may appear consecutively through the transparent front.

2. In a device for the purpose indicated, a signal apparatus comprising a housing provided with a transparent front, a pair of supports arranged in perpendicular position at the ends of the housing adjacent said front, one of said supports having a projection, a spring tensioned roller mounted in the upper corresponding ends of said supports, a reeling chart receiving roller mounted in the lower corresponding ends of said supports, a chart provided with a plurality of direction indications and having one end connected to the spring tensioned roller and rolled thereabout, and its other end detachably connected to the reeling chart receiving roller, the chart receiving reeling roller having a pinion at one end, a supporting plate connected to one of the supports, an actuating master gear mounted between the projection and said plate and meshing with said pinion, a pulley carried by and being substantially the same diameter as the actuating master gear, an actuator operatively connected to the pulley, the construction and arrangement of said gearing and the pulley being such that when the actuator is pulled its full extent and the master gear given a partial rotation, the receiving reeling roller will revolve sufficiently to cause the directions on the chart to appear consecutively behind the transparent front, and illuminating means in the housing to the rear of the chart.

In testimony whereof I hereunto affix my signature.

LEE J. ORENDORF.